Feb. 2, 1926. 1,571,670
A. S. HOWELL
PHOTOGRAPHIC CAMERA
Filed April 17, 1924 2 Sheets-Sheet 1
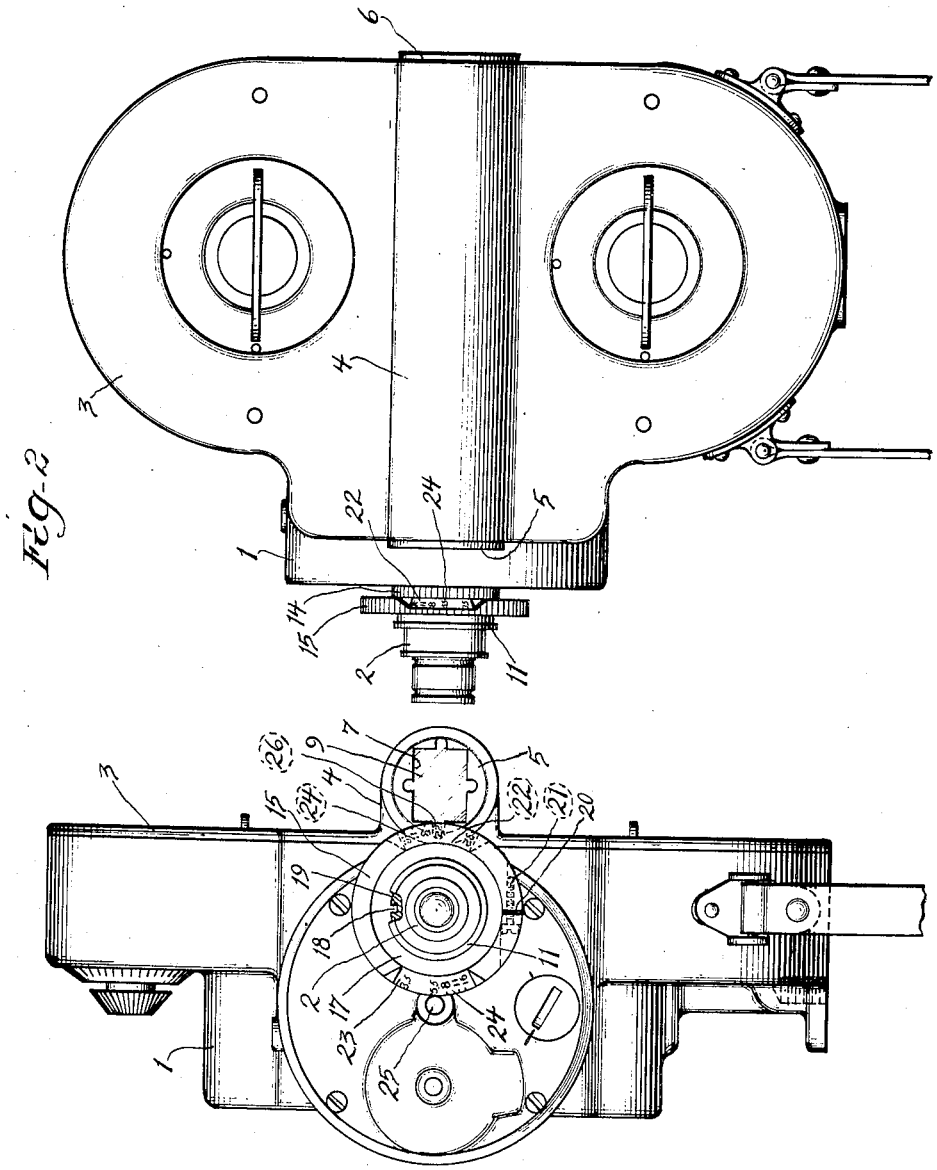
Inventor:-
Albert S. Howell
By Miehle & Miehle,
Attys.

Feb. 2, 1926.
A. S. HOWELL
1,571,670
PHOTOGRAPHIC CAMERA
Filed April 17, 1924    2 Sheets-Sheet 2
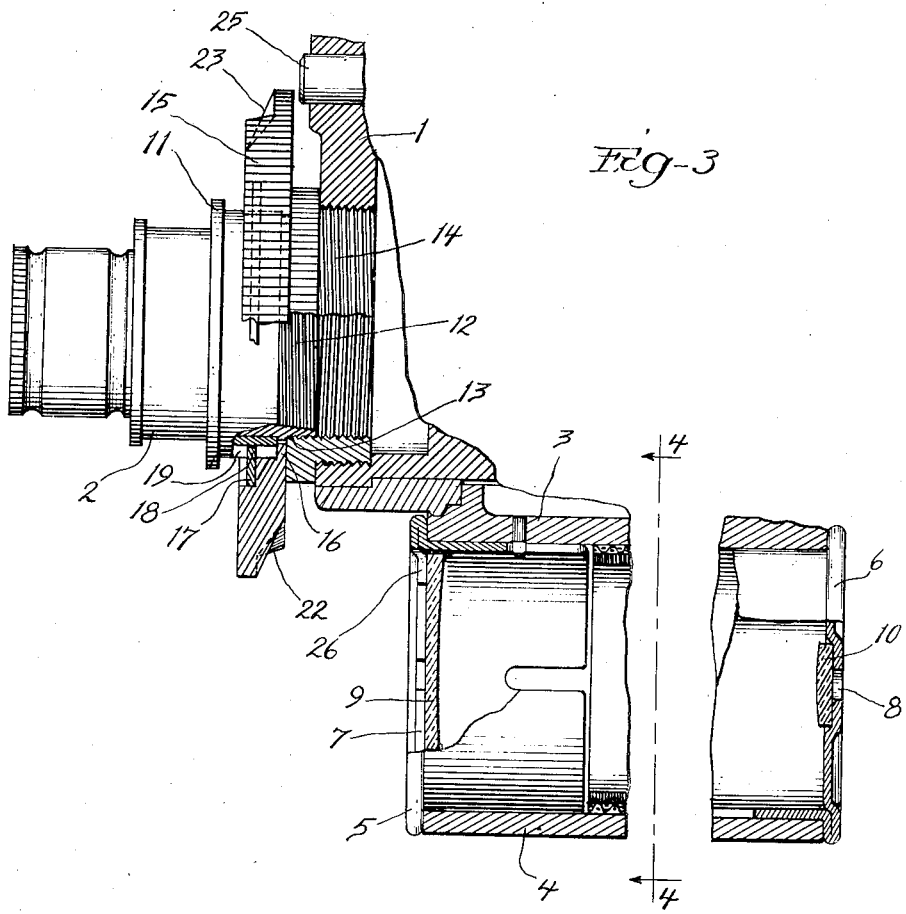
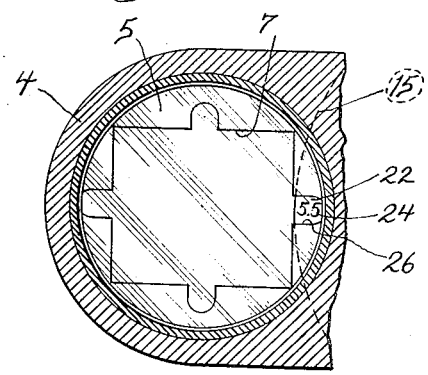
Inventor:
Albert S. Howell
By:- Miehle & Miehle, Attys

Patented Feb. 2, 1926.

1,571,670

UNITED STATES PATENT OFFICE.

ALBERT S. HOWELL, OF CHICAGO, ILLINOIS, ASSIGNOR TO THE BELL & HOWELL COMPANY, OF CHICAGO, ILLINOIS, A CORPORATION OF ILLINOIS.

PHOTOGRAPHIC CAMERA.

Application filed April 17, 1924. Serial No. 707,203.

*To all whom it may concern:*

Be it known that I, ALBERT S. HOWELL, a citizen of the United States, residing at Chicago, in the county of Cook and State of Illinois, have invented a certain new and useful Improvement in Photographic Cameras, of which the following is a full, clear, concise, and exact description, reference being had to the accompanying drawings, forming a part of the specification.

The main object of my invention resides in the provision of means with the photographic lens and view finder of a photographic camera by which the adjustment of the photographic lens is observable through the view finder, thereby permitting the operator to determine the adjustment of the photographic lens and to adjust the same without interrupting his vision through the view finder, the arrangement affording greater ease and convenience in the use of the camera in that it permits the operator to observe and adjust the lens without movement of the camera or operator from their relative photographing positions in addition to acting as a constant reminder to the operator as to the adjustment of the lens while looking through the view finder.

A further object of my invention resides in the provision of a simple and effective adjustable indicating device for application to photographic lenses which are now obtainable in the market whereby such lenses may be adapted for the attainment of the aforementioned object when applied to cameras of certain types without extensive change in the structure of the lenses, the device being at the same time adaptable to a variety of designs of such lenses and adjustable for properly indicating the adjustment of the particular lens to which the device is applied.

With these objects in view my invention consists in certain features of novelty in the construction, combination, and arrangement of parts by which the said objects and certain other objects, hereinafter appearing, are effected, all as fully described with reference to the accompanying drawings and more particularly pointed out in the claims.

In the said drawings—

Figure 1 is a front elevation of a motion picture camera embodying my invention.

Figure 2 is a side elevation of the same.

Figure 3 is an enlarged partial central horizontal sectional view of the camera with parts broken away.

Figure 4 is a partial sectional view on the line 4—4 of Fig. 3.

Like characters of reference indicate like parts in the several views.

Referring to the drawings 1 designates generally the case of the camera on the front of which and adjacent one side of the case is mounted a photographic lens 2 in a manner hereinafter described. The side of the case to which the lens is adjacent consists of a cover 3 which is detachably secured to the main portion of the case and integrally with which is formed an exterior view finder tube formation 4 disposed on an axis alongside and adjacent the focal axis of the lens. Fitted into the front and rear ends respectively of the finder tube formation are cup shaped members 5 and 6, and the transverse wall of the front member 5 forms a mask and is provided with a centrally disposed rectangular opening 7 while the transverse wall of the rear member 6 is provided with a small centrally disposed aperture 8. Complementary lenses 9 and 10 are secured with suitable cement on the insides of the transverse walls of the members 5 and 6 respectively, the lens 9 covering the entire inside surface of the transverse wall of the member 5. Thus is provided a view finder, the operator looking through the aperture 8 in using the same, and the arrangement is such that the opening 7 substantially defines the photographic field of the photographic lens 2.

The photographic lens 2 as shown is of universal focus and is adjustable in that it is provided with a usual adjustable iris mechanism which is adjusted by a usual external angularly movable cylindrical adjusting member 11 carried on the body 12 of the lens. The body of the lens projects rearwardly from the member 11 and is shouldered and screwthreaded at the rear end thereof as is usual, as designated at 13, for the mounting of the lens. As shown the lens 2 is mounted on the camera casing by means of the portion 13 of the body 12 thereof being screwthreaded into a bushing 14 which in turn is screwthreaded in an aperture in the case 1 of the camera. See Fig. 3.

A relatively large angularly movable annular member 15, provided with two steps in its bore facing in the same direction and forming an interior flange 16 at the smallest portion of its bore, has the flange 16 thereof lying between the rear end of the adjusting member 11 and the bushing 14 with the adjusting member 11 projecting into the larger portions of the bore thereof, the rear end of the adjusting member 11 and the bushing 14 providing end thrusts for the member 15. A second annular member 17 encircles the adjusting member 11 and is engaged in the largest portion of the bore of the member 15, and is provided with an interior lug 18 engaged in an external axially extending key slot 19 in the adjusting member 11 to angularly fix the same with the adjusting member 11. The annular member 15 is radially split as designated at 20, and a headed screw 21 passes through a bore in the member 15 at one side and transverse to the split thereof and is screw-threaded into the same at the other side of the split for frictionally clamping the member 15 upon the member 17 in any adjusted position with respect thereto. Thus the member 15 is adjustably secured for angular movement with the adjusting member 11.

The member 15 sweeps past in front of the transverse wall of the member 5 on the side of the rectangular opening 7 in the member 5 adjacent the lens 2, and is provided with opposite bevel surfaces 22 and 23 extending inwardly from the periphery of the member 5 and disposed diametrically opposite thereon. The surface 22 faces rearwardly and is disposed to lie in front of the member 5, and the surface 23 faces forwardly. Similar angularly extending scales 24 are formed on the surfaces 22 and 23 for indicating the adjustment of the iris mechanism of the lens, a stud 25 on the casing 1 cooperating with the scale 24 on the surface 23 for this purpose. The member 5 is provided with an opening 26, in addition to the opening 7, which is in the form of a slot at the side of the opening 7 adjacent the lens 2. The scale 24 on the surface 22 of the member 15 is observable through the view finder outside the field of the lens 2 defined therein and at the opening 26 to determine the adjustment of the iris mechanism in an obvious manner. See particularly Fig. 4. Thus it will be observed that the operator can observe at all times the adjustment of the iris mechanism with consequent ease and convenience in the operation of the camera. By reason of the size of the member 5 the operator can easily adjust the iris mechanism without changing the position of the camera or interrupting his vision through the view finder.

While I have described and shown the preferred embodiment of my invention I do not wish to be limited to the precise details of construction as changes may readily be made without departing from the spirit of my invention, but having thus described my invention, I claim as new and desire to secure by Letters Patent the following:—

1. In a photographic camera the combination with an adjustable photographic lens of a view finder coordinated with the lens, and means indicating adjustment of the photographic lens and adapted to be observed through the view finder to determine the adjustment of the lens as and for the purpose described.

2. In a photographic camera the combination with a photographic lens provided with an adjustable iris mechanism of a view finder substantially defining the photographic field of the lens, and means indicating adjustment of the iris mechanism and adapted to be observed through the view finder outside of the field of the photographic lens defined therein to determine the adjustment of the iris mechanism as and for the purpose described.

3. In a photographic camera the combination with an adjustable photographic lens of a view finder arranged on an axis alongside and adjacent the focal axis of the lens and substantially defining the photographic field of the lens, and means indicating adjustment of the lens and including a member carried by the lens for angular movement and provided with an indicating scale adapted to be observed through the view finder for indicating adjustment of the lens.

4. In a photographic camera the combination with a photographic lens provided with an adjustable iris mechanism of a view finder arranged on an axis alongside and adjacent the focal axis of the lens and including a forwardly disposed mask provided with an opening substantially defining the photographic field of the lens and further provided with an additional opening on the side of the first mentioned opening adjacent the lens, and means indicating adjustment of the iris mechanism and including an angularly movable member carried by the lens and provided with an indicating scale adapted to be observed through the view finder at said additional opening of the mask for determining adjustment of the iris mechanism.

5. In a photographic camera the combination with an adjustable photographic lens of a view finder arranged on an axis alongside and adjacent the focal axis of the lens and including a forwardly disposed mask provided with a rectangular opening substantially defining the photographic field of the lens and further provided with an additional opening in the form of a slot at the side of the rectangular opening adjacent the lens, and means indicating adjustment of the photographic lens and including a member carried by the lens for angular movement and provided with an indicating scale adapted to be observed through the view finder at said slot for indicating adjustment of the lens.

6. In a photographic camera the combination with a photographic lens of universal focus and provided with an adjustable iris mechanism of a view finder arranged on an axis alongside and adjacent the focal axis of the lens and including a forwardly disposed mask provided with a rectangular opening substantially defining the photographic field of the lens and further provided with an additional opening in the form of a narrow slot at the side of the rectangular opening adjacent the lens, and means indicating adjustment of the iris mechanism and including a relatively large circular member secured with the iris mechanism for angular movement in the adjustment of the iris mechanism and provided with an indicating scale disposed to sweep across in front of the mask at said slot and adapted to be observed through the view finder at said slot for indicating adjustment of the iris mechanism.

7. The combination in a device for application to a photographic lens provided with an exterior angularly movable cylindrical adjusting member of an annular member provided with an angularly extending scale and a step in its bore forming an interior flange adapted to lie between the adjusting member and a part upon which the lens is mounted with the adjusting member projecting into the larger portion of the bore of the annular member, and means for adjustably securing the annular member with the adjusting member and adapted to permit angular adjustment of the annular member with respect to the adjusting member.

8. The combination in a device for application to a photographic lens provided with an exterior angularly movable cylindrical adjusting member provided with an external recess of an annular member provided with an angularly extending scale and with a step in its bore forming an interior flange adapted to lie between the adjusting member and a part upon which the lens is mounted with the adjusting member projecting into the larger portion of the bore of the annular member, a second annular member adapted to fit over the adjusting member and to lie within the larger portion of the bore of the first mentioned annular member and provided with a lug engageable in said external recess for angularly securing the same with the adjusting member, and means for adjustably securing the first mentioned annular member with the second annular member and adapted to permit angular adjustment of the first mentioned annular member with respect to the second annular member.

9. The combination in a device for application to a photographic lens provided with an exterior angularly movable cylindrical adjusting member provided with an external axially extending external key slot of a radially split annular member provided with an angularly extending scale and with a step in its bore forming an interior flange adapted to lie between the adjusting member and a part upon which the lens is mounted with the adjusting member projecting into the larger portion of the bore of the annular member, a second annular member adapted to fit over the adjusting member and to engage in the larger portion of the bore of the first mentioned annular member and provided with a lug engaging said key slot, and releasable means for clamping the first mentioned annular member at the split thereof upon the second annular member and adapted to permit angular adjustment of the first mentioned annular member with respect to the second annular member.

10. The combination in a device for application to a photographic lens provided with an exterior angularly movable cylindrical adjusting member provided with an external axially extending key slot of a radially split annular member provided with an angularly extending scale and with two steps in its bore facing in the same direction and forming an interior flange at the smallest portion of the bore adapted to lie between the adjusting member and a part upon which the lens is mounted with the adjusting member projecting into the larger portions of the bore of the annular member, a second annular member adapted to fit over the adjusting member and to engage in the largest portion of the bore of the first mentioned annular member and provided with a lug engaging said key slot, and a headed screw passing through a bore in the first mentioned annular member at one side of and transverse to the split thereof and screwthreaded into the same at the other side of the split for frictionally clamping this annular member upon the second annular member.

In witness whereof I hereunto affix my signature this 15th day of April, 1924.

ALBERT S. HOWELL.